United States Patent
Ryan et al.

(10) Patent No.: US 6,898,738 B2
(45) Date of Patent: May 24, 2005

(54) HIGH INTEGRITY CACHE DIRECTORY

(75) Inventors: Charles P. Ryan, Phoenix, AZ (US);
William A. Shelly, Phoenix, AZ (US);
Stephen A. Schuerich, Phoenix, AZ (US)

(73) Assignee: Bull HN Information Systems Inc., Billerica, MA (US)

(*) Notice: Subject to any disclaimer, the term of this patent is extended or adjusted under 35 U.S.C. 154(b) by 723 days.

(21) Appl. No.: 09/907,302

(22) Filed: Jul. 17, 2001

(65) Prior Publication Data
US 2003/0018936 A1 Jan. 23, 2003

(51) Int. Cl.[7] .............................................. G06F 11/00
(52) U.S. Cl. ........................... 714/42; 714/5; 714/49; 714/54
(58) Field of Search .......................... 714/42, 5, 49, 714/48, 54

(56) References Cited
U.S. PATENT DOCUMENTS

| | | | |
|---|---|---|---|
| 4,945,512 A | | 7/1990 | DeKarske et al. |
| 5,479,641 A | | 12/1995 | Nadir et al. |
| 5,729,677 A | * | 3/1998 | Wu et al. ............... 714/42 |
| 5,867,511 A | * | 2/1999 | Arimilli et al. ........ 714/805 |
| 5,916,314 A | * | 6/1999 | Berg et al. ............. 714/6 |
| 6,240,532 B1 | * | 5/2001 | Cho ...................... 714/42 |
| 6,681,299 B1 | * | 1/2004 | Shimamura et al. .... 711/145 |
| 6,708,294 B1 | * | 3/2004 | Nakao et al. ........... 714/42 |

* cited by examiner

*Primary Examiner*—Robert Beausoliel
*Assistant Examiner*—Yolanda L Wilson
(74) *Attorney, Agent, or Firm*—James H. Phillips; Bruce E. Hayden

(57) ABSTRACT

Cache memory, and thus computer system, reliability is increased by duplicating cache tag entries. Each cache tag has a primary entry and a duplicate entry. Then, when cache tags are associatively searched, both the primary and the duplicate entry are compared to the search value. At the same time, they are also parity checked and compared against each other. If a match is made on either the primary entry or the duplicate entry, and that entry does not have a parity error, a cache "hit" is indicated. All single bit cache tag parity errors are detected and compensated for. Almost all multiple bit cache tag parity errors are detected.

8 Claims, 7 Drawing Sheets

HIGH INTEGRITY CACHE DIRECTORY

FIELD OF THE INVENTION

The present invention generally relates to data processing systems, and more specifically to a high integrity cache memory directory.

BACKGROUND OF THE INVENTION

Cache memories have become integral to computer systems. They provide an important performance benefit through minimizing the number of times that it is necessary to read and/or write slower auxiliary memories (such as DRAM) across even slower memory busses. They typically operate at or near the same speed as the processor that they are supporting, and indeed, are often integrated into processors. They also tend to be constructed utilizing the same technologies and feature sizes as the processors.

However, the feature size for cache memories continues to shrink as the speed at which they are required to operate continues to climb, along with that of the processors. As such, the potential for bit errors increases. Meanwhile, the requirement for fault-free operation continues to increase for mission critical and large scale computer systems.

One problem that exists for cache memories, probably more than for any other portion of a computer system, is that bit errors can be extremely harmful to the operation of the entire computer system. Many bit errors detected during processor operation can be recovered from, for example by notifying or aborting the task or job currently executing. Auxiliary memory (such as DRAM) can utilize Error Correction Codes (ECC) that allow automatic single bit correction and detection of most multiple bit errors.

Cache memories on the other hand are required to operate at much higher speeds than slower auxiliary memories. The speed difference may be 5× or maybe even 10× with today's technologies. ECC is thus not realistic, since the time involved to detect and correct these errors would invariably require extra cache memory cycles to perform.

One reason that cache memory bit failures can be so catastrophic to a computer system is that when an error occurs, and if it is detected, it is sometimes not possible (or extremely hard and expensive) to determine the state of the memory of the computer system. For example, if an error is detected in a cache tag, it is not directly possible to determine which auxiliary (DRAM) memory block corresponds to that cache tag. With a 14 bit cache tag) and a single bit error, potentially 14 different blocks of auxiliary memory may be implicated. If the cache memory has ownership of that block of memory, then any one of the potential 14 blocks of auxiliary memory may or may not be valid. Since it is impractical to determine which block of memory is implicated, it is difficult, if not infeasible, to terminate the job or task running in that memory. The only realistic result in some situations then is to reinitialize any processors that may be using that cache memory in order to guarantee that the job or task executing in that memory is terminated.

It would thus be advantageous to have available a mechanism to efficiently detect and compensate for any cache memory address tag bit errors.

SUMMARY OF THE INVENTION

Briefly, this and other objectives of the invention are achieved by which cache memory reliability is increased by duplicating cache tag entries. Each cache tag has a primary entry and a duplicate entry. Then, when cache tags are associatively searched, both the primary and the duplicate entry are compared to the search value. At the same time, they are also parity checked and compared against each other. If a match is made on either the primary entry or the duplicate entry, and that entry does not have a parity error, a cache "hit" is indicated. All single bit cache tag parity errors are detected and compensated for. Almost all multiple bit cache tag parity errors are detected.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

Cache memory, and thus computer system, reliability is increased by duplicating cache tag entries. Each cache tag has a primary entry and a duplicate entry. Then, when cache tags are associatively searched, both the primary and the duplicate entry are compared to the search value. At the same time, they are also parity checked and compared against each other. If a match is made on either the primary entry or the duplicate entry, and that entry does not have a parity error, a cache "bit" is indicated. All single bit cache tag parity errors are detected and compensated for. Almost all multiple bit cache tag parity errors are detected.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
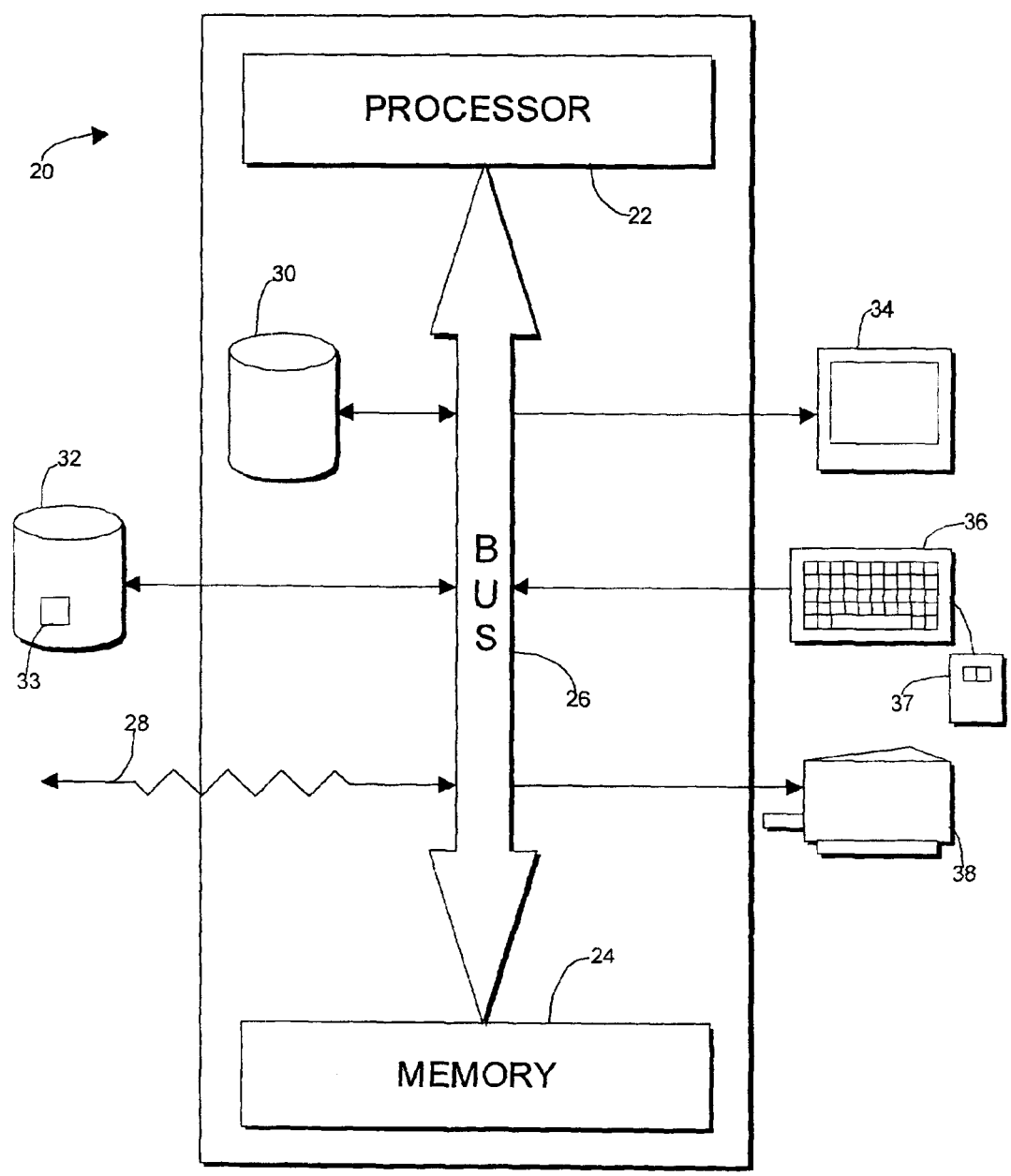
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
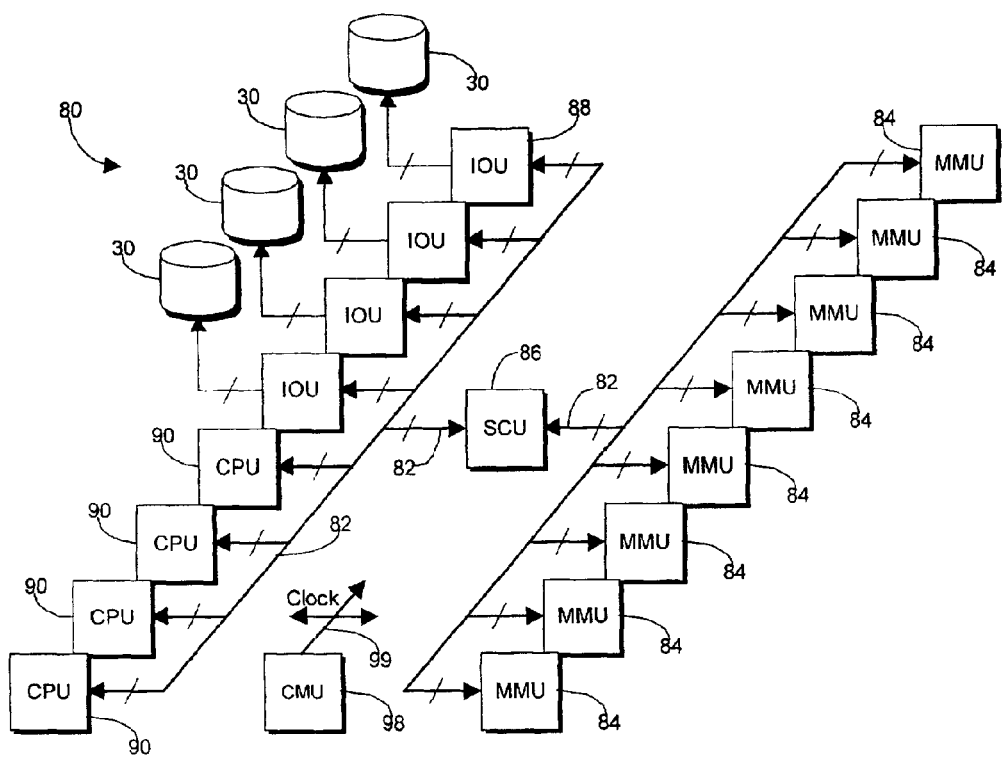
FIG. 2 is a block diagram of a more detailed view of a multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 (see FIG. 1) is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Figure 3:
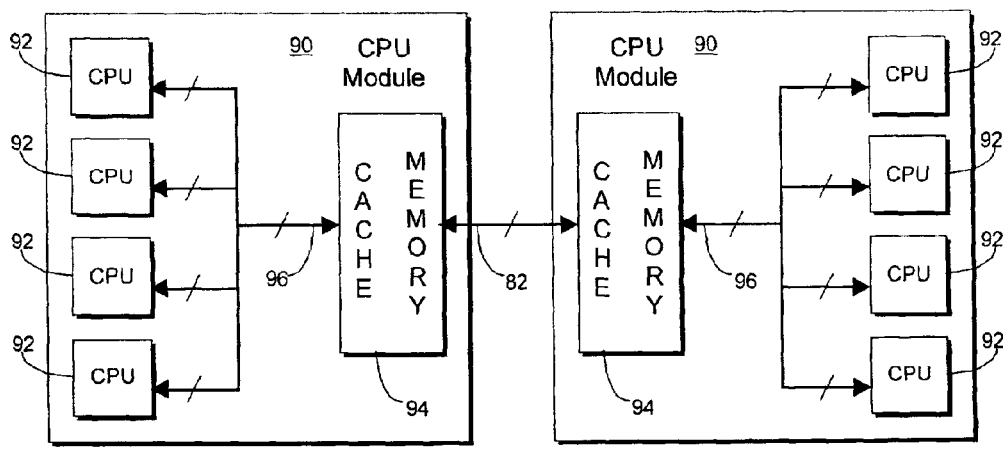
FIG. 3 is a block diagram illustrating a pair of processor (CPU) modules as shown in FIG. 2.

FIG. 3 is a block diagram illustrating a pair of processor (CPU) modules 90 as shown in FIG. 2. The two CPU modules 90 are coupled together and communicate over the intramodule bus 82. The CPU modules 90 each contain a plurality of processors (CPU) 92 and a Level 2 (L2) cache memory system 94 shared among the processors 92. In the preferred embodiment, each processor (CPU) module 90 contains up to four (4) processors (CPU) 92. The processors 92 and their L2 cache memory system 94 are coupled together and communicate over an intraprocessor bus 96.

The Level 2 (L2) cache memory system 94 is shared among the processors 92 in a CPU module 90. The L2 cache memory system 94 maintains cache copies of data loaded into those processors 92. The cache memory system 94 is considered here a Level 2 cache and is coupled to and communicates with the storage control system (SCU) 86 over the intramodule bus 82 in order to maintain cache coherency between Level 2 (L2) cache memories 94 in each of the processor (CPU) modules 90, as well as between cache Level 1 (L1) cache memories 256 in each of the processors 92, and on the IOU modules 88. The SCU 86 also maintains coherency between the various cache memories 94, 256, and the typically slower speed memory in the MMU modules 84. In the preferred embodiment, a single block of memory or cache line will be owned for update by a single cache or memory at potentially each level in the memory hierarchy. Thus, a given memory block or cache line may be owned by one Level 1 (L1) cache 256, by one Level 2 (L2) cache 94, and by one MMU 84. However note that that a cache line can be held for read (only) by multiple caches in the hierarchy.

Figure 4:
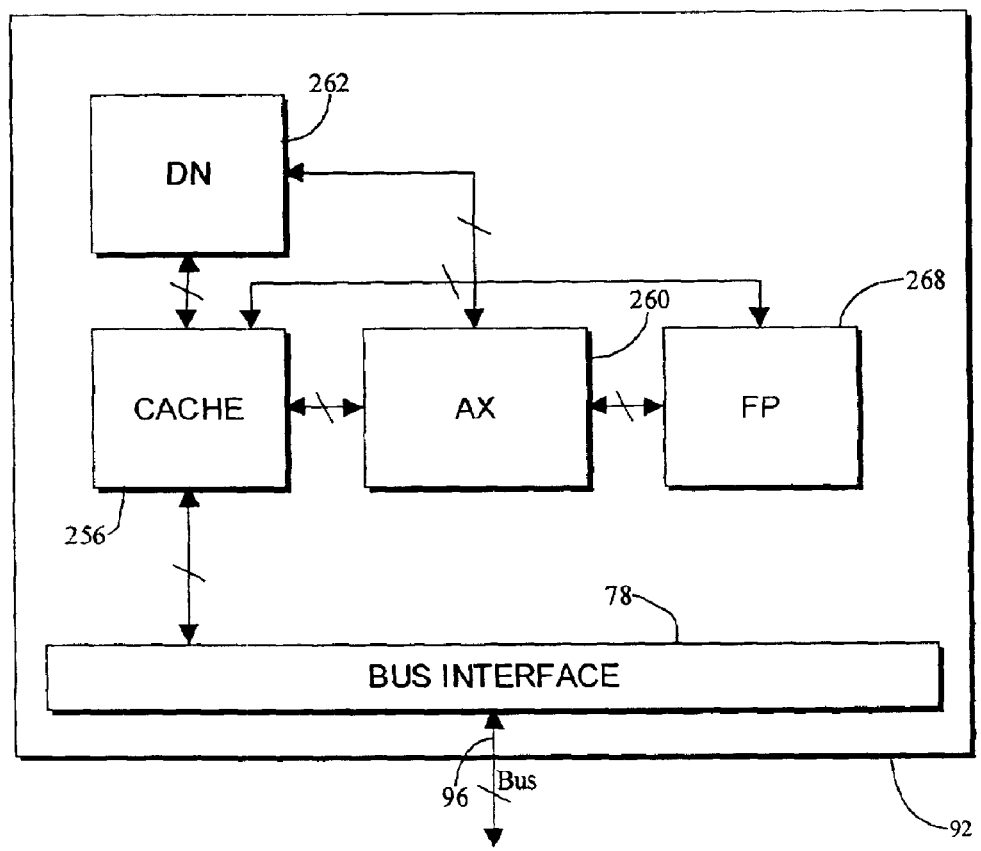
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local (level 2 or L2) cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96. Implementations which separately cache instructions and data do not modify this embodiment.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating-point unit 268 performs both floating-point operations, and fixed-point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Figure 5:
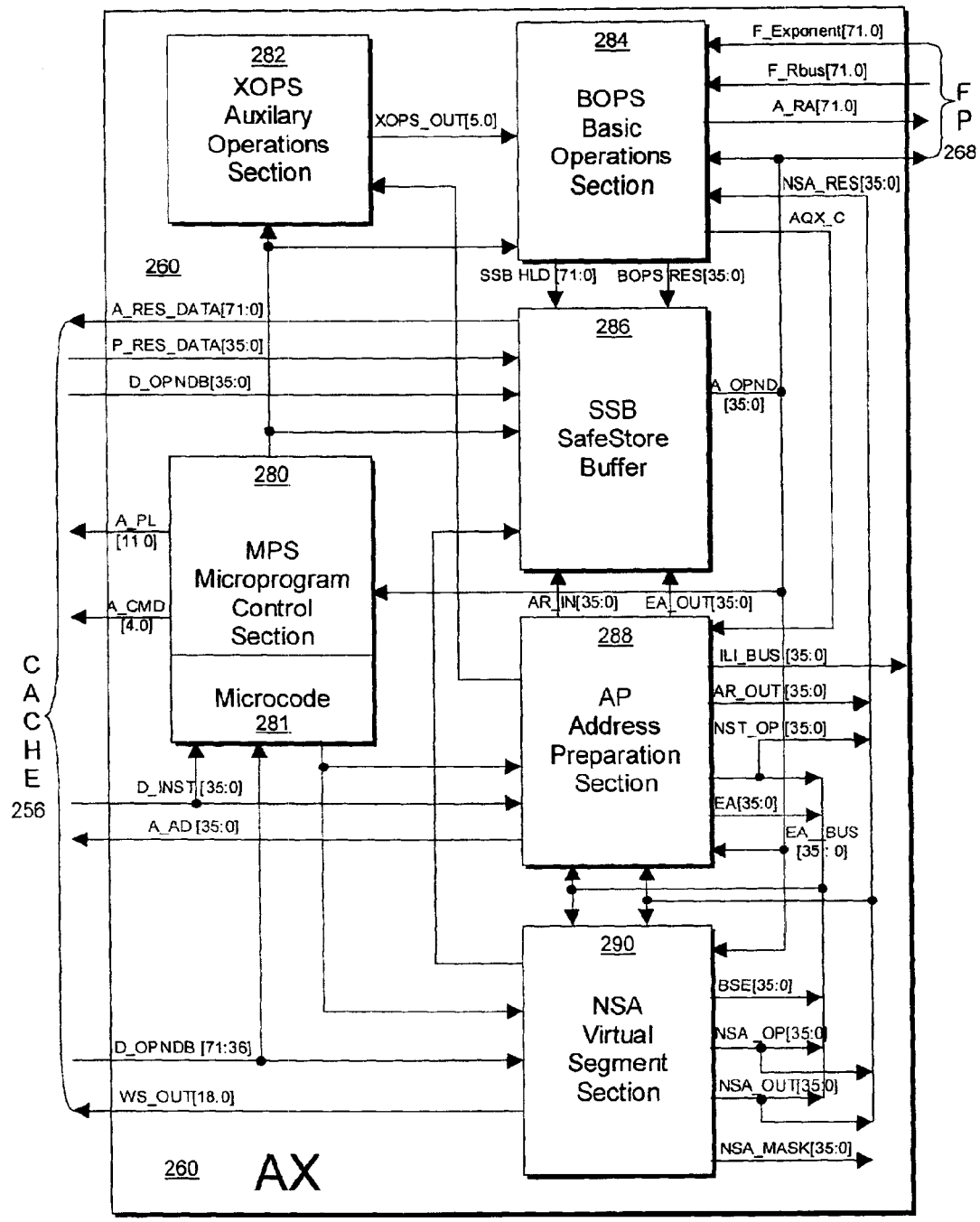
FIG. 5 is a block diagram of an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262 (not shown here), the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 stores the current status of the processor 92 environment, including user and segment registers, for the purpose of changing processor state. The SSB 286 is coupled to and receives signals from the BOPS 284, the AP section 288, the MPS 280, and the NSA 290. The SSB 286 is bidirectionally coupled to the local cache 256, allowing SSB 286 frames to be pushed out to local cache 256 when entering a new processor environment, and pulled back from local cache 256 when returning to an old processor environment.

Figure 6:
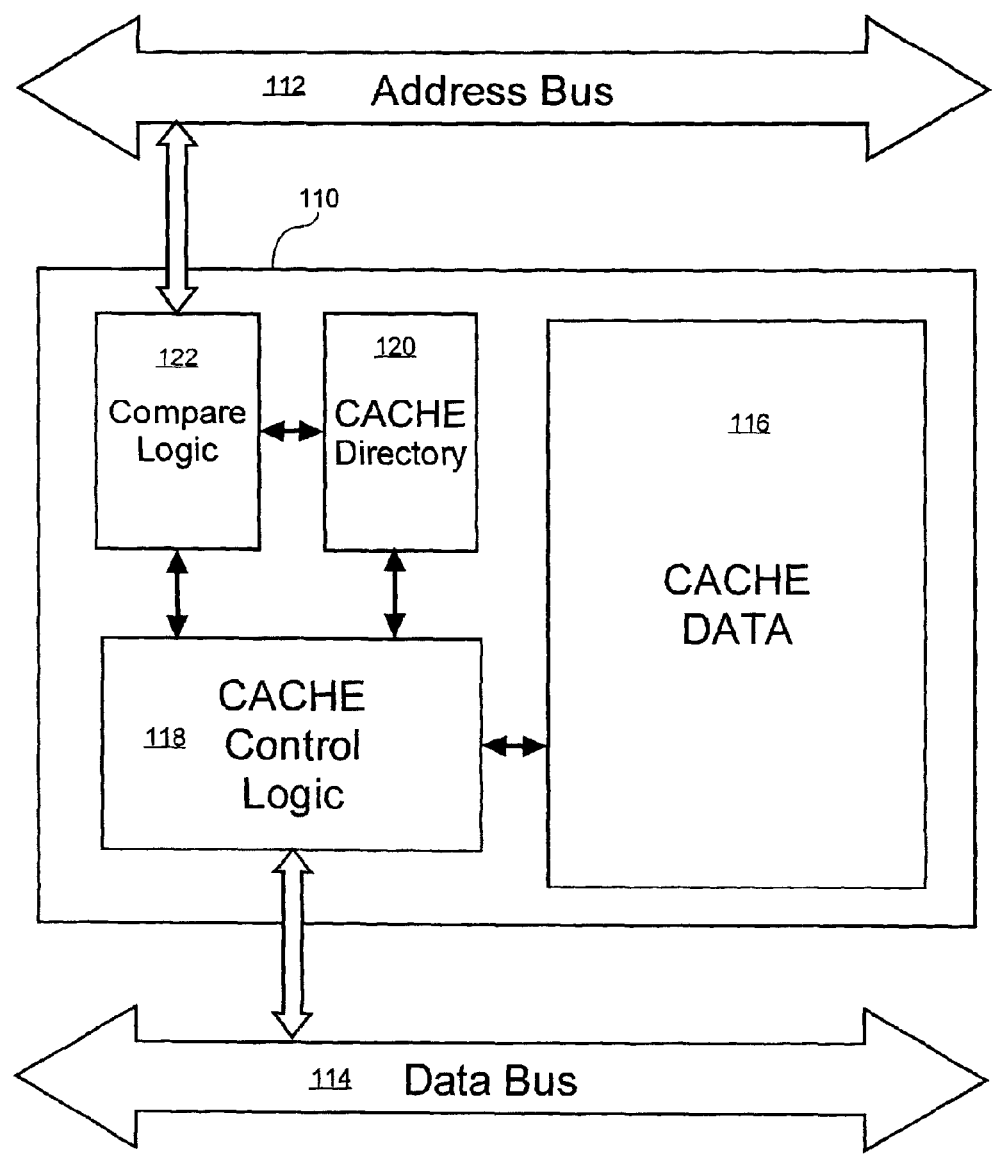
FIG. 6 is a block diagram illustrating an exemplary cache.

FIG. 6 is a block diagram illustrating an exemplary cache. The cache 110 receives address and command information from an address bus 112. Within the cache 110, addresses are received by compare logic 122. The compare logic 122 typically compares portions of the addresses received with entries in a cache directory 120. Each entry in the cache directory 120 typically corresponds to a cache line in a cache data block 116. When an address requested on the address bus 112 matches (using the compare logic 122) an entry in the cache directory 120, the match is considered a cache "hit". Cache control logic 118 then will determine what to do with that cache "hit" based upon among other things what the memory command being executed requires. Thus, if a processor is attempting to read a word from memory, the cache control logic 118, upon encountering a cache "hit", will read the selected word from the cache line corresponding to the "hitting" entry in the cache directory 120. This word is then transmitted over a data bus 114 back to the requesting processor. The cache directory 120 and cache data 116 are typically constructed of fast static RAM (SRAM).

Cache memories are well known in the prior art and are heavily utilized in most modern computers. The above exemplary cache is included herein as an example. Other cache organizations and architectures are within the scope of this invention.

Figure 7:
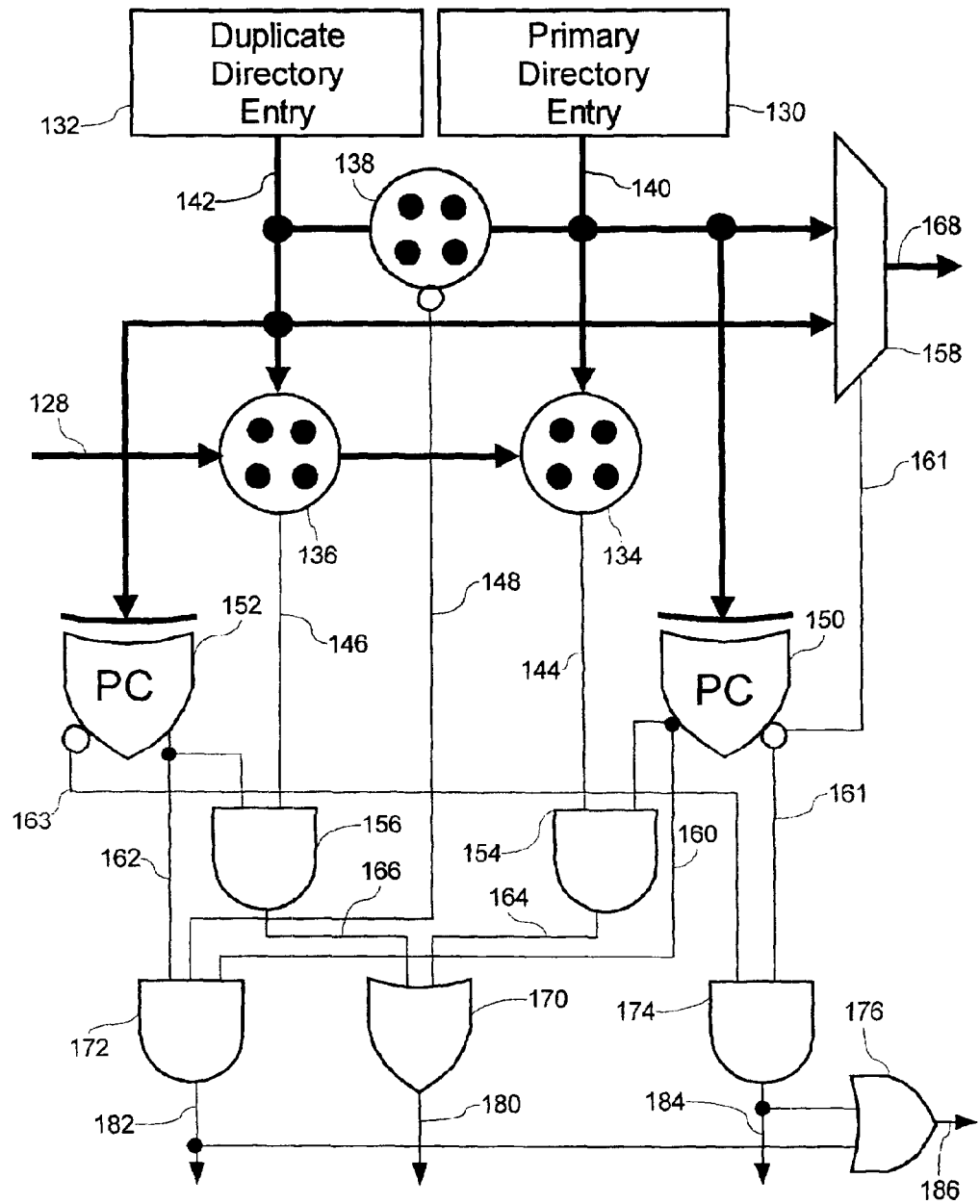
FIG. 7 is a block diagram illustrating an improved cache compare logic and directory, in accordance with a preferred embodiment of the present invention.

FIG. 7 is a block diagram illustrating an improved cache compare logic and directory, in accordance with a preferred embodiment of the present invention. Two copies of each directory entry in the cache directory 120 are maintained. One is considered the Primary Directory Entry 130 and the second is considered the Duplicate Directory Entry 132. They are typically written in parallel and under normal conditions should contain the same information. Each directory entry 130, 132 will typically also include one or more parity bits. The output from the Primary Directory Entry 130 is a set of Primary Directory Entry Contents Signals 140. Similarly, the output from the Duplicate Directory Entry 132 is a set of Duplicate Directory Entry Contents Signals 142. These two signals include the corresponding parity bits.

Coupled to and receiving the Primary Directory Entry Contents Signals 140 is a first comparator 134. The other input to the first comparator 136 are the Input Address Signals 128 being tested for a match or "hit". These are typically a subset of the address signals presented to the cache 110. When the Primary Directory Entry Contents Signals 140 matches the Input Address Signals 128, the first comparator 134 asserts a Primary Entry Matched Signal 144. Otherwise, the signal 144 is negated. Similarly, coupled to and receiving the Duplicate Directory Entry Contents Signals 142 is a second comparator 136. The other input to the second comparator 136 are the Input Address Signals 128. When the Duplicate Directory Entry Contents Signals 142 matches the Input Address Signals 128, the second comparator 136 asserts a Duplicate Entry Matched Signal 146. Otherwise, the signal 146 is negated.

Coupled to and receiving the Primary Directory Entry Contents Signals 140 and the Duplicate Directory Entry Contents Signals 142 is a third comparator 134 which performs a bit-for-bit comparisons between the outputs of the two directory entries 130, 132. The third comparator 134 has an inverted output which is a Miscompare signal 144. This signal 144 is asserted whenever the contents of the two directory entries 130, 132 differ (and is negated when they match).

Also coupled to and receiving the Primary Directory Entry Contents Signals 140 is Primary Entry Parity Computation Logic 150. This Primary Entry Parity Computation Logic 150 tests parity for the Primary Directory Entry 130 whenever it is used. The Primary Entry Parity Computation Logic 150 asserts a Primary Entry Parity Good Signal 160 when the parity is good, and its inverse, a Primary Entry Parity Bad Signal 161 when the parity is bad. Similarly, also coupled to and receiving the Duplicate Directory Entry Contents Signals 142 is Duplicate Entry Parity Computation Logic 152. This Duplicate Entry Parity Computation Logic 152 tests parity for the Duplicate Directory Entry 132 whenever it is used. The Duplicate Entry Parity Computation Logic 152 asserts a Duplicate Entry Parity Good Signal 162 when the parity is good, and its inverse, a Duplicate Entry Parity Bad Signal 163 when the parity is bad. In this FIG., the Primary Entry Parity Computation Logic 150 and the Duplicate Entry Parity Computation Logic 152 are shown as XOR gates. It should be understood that this is illustrative of one common method of parity computation. However, other methods of computing and testing parity are also within the scope of this invention.

Also coupled to and receiving the Primary Directory Entry Contents Signals 140 and the Duplicate Directory Entry Contents Signals 142 is a 2×1 MUX 158. The 2×1 MUX 158 selects the contents of one or the other of the two directory entries 130, 132, depending on the value of the Primary Entry Parity Bad Signal 161. When the Primary Entry Parity Bad Signal 161 is negated, the Primary Directory Entry Contents Signals 140 are selected, and when the signal 161 is asserted, the Duplicate Directory Entry Contents Signals 142 are selected. The output from the 2×1 MUX 158 are provided to the cache control logic 118 as the Selected Directory Entry Signals 168.

Coupled to and receiving as input the Primary Entry Matched Signal 144 and the Primary Entry Parity Good Signal 160 is a two-input Primary Entry Hit AND gate 154 which asserts a Primary Entry lit Signal 164 when both of its input signals 160, 144 are asserted. Similarly, coupled to and receiving as input the Duplicate Entry Matched Signal 144 and the Duplicate Entry Parity Good Signal 162 is a two-input Duplicate Entry Hit AND gate 156 which asserts a Duplicate Entry Hit Signal 166 when both of its input signals 162, 146 are asserted. Coupled to and receiving as input the Primary Entry Hit Signal 164 and the Duplicate Entry Hit Signal 166 is a two-input Hit OR gate 170 which asserts a "Hit" signal 180 whenever either of its two input hit signals 164, 166 is asserted.

Coupled to an receiving as input the Primary Entry Parity Good Signal 160, the Duplicate Entry Parity Good Signal 162, and the Mismatch Signal 144 is a three input Miscompare and No Parity Error AND gate 172 which asserts a Miscompare and No Parity Error Signal 182 when all three input signals 160, 162, 144 are asserted. Coupled to and receiving as input the Pi Entry Parity Bad Signal 161 and the Duplicate Entry Parity Bad Signal 163 is a two-input Parity Error on Both Entries AND gate 174 which asserts a Parity Error on Both Entries Signal 184 when both of its input signals 161, 163 are asserted. Coupled to and receiving as input the Miscompare and No Parity Error Signal 182 and the Parity Error on Both Entries Signal 184 is a two-input Fatal Error OR gate 176 which asserts a Fatal Error Signal 186 when either of its two inputs 182, 184 is asserted.

Thus, whenever the Primary Directory Entry Contents Signals 140 match the Input Address Signals 128 and the parity is good for the Primary Directory Entry 130, the Primary Directory Entry Contents Signals 140 are output 168 and a "Hit" signal 180 is asserted. Otherwise, whenever the Duplicate Directory Entry Contents Signals 142 match the Input Address Signals 128 and the parity is good for the Duplicate Directory Entry 132, the Primary Directory Entry Contents Signals 140 are output 168 and a "Hit" signal 180 is asserted. However, a fatal error is detected if parity is good for both directory entries 130, 132, but they do not match, or if parity is bad for both directory entries 130, 132.

Figure 8:
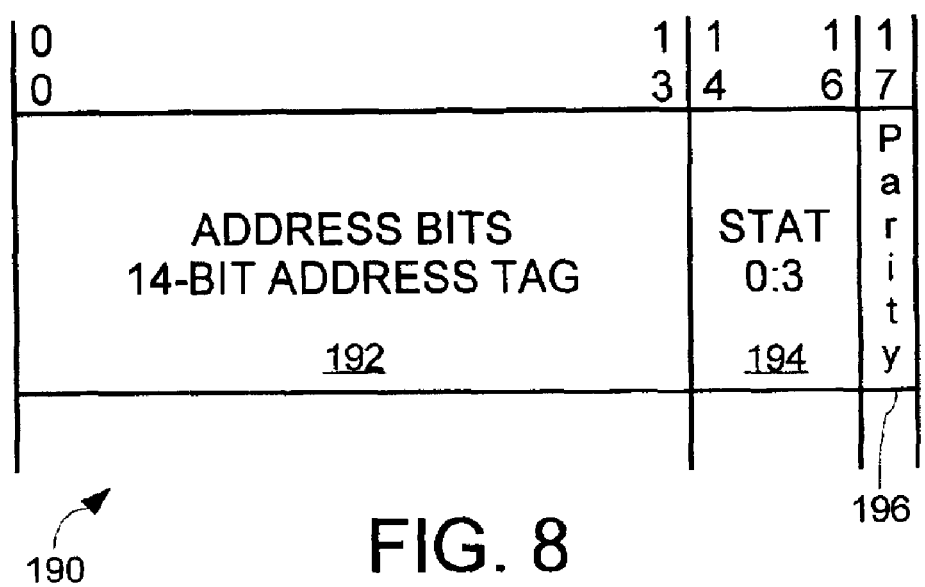
FIG. 8 is a block diagram illustrating the format of each of the Primary Directory Entries 130 and Duplicate Directory Entries 132 in the cache directory 120, in accordance with a preferred embodiment of the present invention.

FIG. 8 is a block diagram illustrating the format of each of the Primary Directory Entries 130 and Duplicate Directory Entries 132 in the cache directory 120, in accordance with a preferred embodiment of the present invention. Each directory entry 190 in the preferred embodiment is 18 bits. The directory entry 190 contains 14 address bits 192, three status bits 194, and one parity bit 196. Note that in the preferred embodiment, a single parity bit is stored for each directory entry 130, 132, 190. This is considered more than adequate for the number of address bits being parity protected. However, other numbers of parity bits and other parity detection mechanisms are also within the scope of this invention.

This is an extremely efficient method of greatly increasing the reliability of cache directory entries at a very low cost in circuitry and speed. As for the cost in time or speed, a single bit-for-bit comparison 134 between a directory entry 130 and the Input Address Signals 128 is required by the prior art. In this invention, the other two bit-for-bit comparisons 136, 138, as well as computing and testing parity 150, 152 are done in parallel with that comparison 134, thus not requiring any more cycles for the portions of this method that take the most time. The only real cost in time is the addition of the Hit AND gates 154, 156, and OR gate 170 to generate the "Hit" signal 180 and the 2×1 Mux 158 to generate the output signals 168 when there is a hit, and these can typically be done in the same cycle as the compares. In trade for this minimal increase in path lengths (and typically with no increase in cycles required), cache directory reliability is significantly increased. If directory entry errors are fairly rare in the prior art, the probability of having both the Primary Entry 130 and the Duplicate Entry 132 being bad at the same time is almost nonexistent utilizing this invention.

All one bit parity errors will be detected and compensated for through the parity checking 150, 152 and the selection of the matching entry without parity errors. All odd numbers of bad bits in one directory entry 130, 132 will be automatically detected and compensated for through the parity checking and selection of the matching entry without parity errors. An odd number of bad bits in both directory entries 130, 132 will be almost always be detected 184. An even number of bad bits in either or both directory entries 130, 132 will be almost always be detected 182 since the two directory entries 130, 132 will miscompare 148. The result is substantially more reliability than would be possible with a single parity bit 196 and a single directory entry 130, 132.

Those skilled in the art will recognize that modifications and variations can be made without departing from the spirit of the invention Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of comparing cache tag entries against a cache target utilizing a primary cache entry and a duplicate cache entry loaded with a same tag value, wherein:

said method comprises:

A) comparing a primary cache entry output from the primary cache entry against the cache target;

B) comparing a duplicate cache entry output from the duplicate cache entry against the cache target;

C) selecting the primary cache entry output as a cache entry output if the primary cache entry output matches the cache target;

D) selecting the duplicate cache entry output as the cache entry output if the primary cache entry output does not match the cache target;

E) testing a primary cache entry parity of the primary cache entry output for a primary cache entry parity result;

F) testing a duplicate cache entry parity of the duplicate cache entry output for a duplicate entry parity result;

G) identifying a primary cache entry hit when the primary cache entry output matches the cache target and the primary cache entry parity result is good;

H) identifying a duplicate cache entry hit when the duplicate cache entry output matches the cache target and the duplicate cache entry parity result is good;

I) identifying a cache entry hit when either the primary cache entry hit has been identified in step (G) or when the duplicate cache entry hit has been identified in step (H);

J) comparing the primary cache entry output to the duplicate cache entry output;

K) identifying a multiple bit parity error when the primary cache entry output does not match the duplicate cache entry output and the primary cache parity result is good and the duplicate cache entry parity result is good;

L) identifying a both cache entries bad error when the primary cache parity result is bad and the duplicate cache entry parity result is bad; and M) identifying a fatal entry error when either a multiple bit parity error was identified in step (G) or a both cache entries bad error was identified in step (H).

2. The method in claim 1 wherein:
the comparing in steps (A), (B), and (J) and the parity testing in steps (E) and (F) are performed substantially in parallel.

3. The method in claim 1 wherein:
the testing of the primary cache entry parity in step (F) and the testing of the duplicate cache entry parity in step (G) utilize XOR parity testing resulting in even parity.

4. A cache compare circuitry for comparing cache tag entries against a cache target utilizing a primary cache entry and a duplicate cache entry loaded with a same tag value, wherein:
said cache compare circuitry comprises:
A) circuitry for comparing a primary cache entry output from the primary cache entry against the cache target;
B) circuitry for comparing a duplicate cache entry output from the duplicate cache entry against the cache target;
C) circuitry for selecting the primary cache entry output as a cache entry output if the primary cache entry output matches the cache target;
D) circuitry for selecting the duplicate cache entry output as the cache entry output if the primary cache entry output does not match the cache target;
E) circuitry for testing a parity of the primary cache entry output and asserting a primary cache entry parity result good when the parity of the primary cache entry output is good;
F) circuitry for testing a parity of the duplicate cache entry output and asserting a duplicate cache entry parity result good when the parity of the duplicate cache entry output is good;
G) circuitry for asserting a primary cache entry hit when the primary cache entry output matches the cache target and the primary cache entry parity result good is asserted;
H) circuitry for asserting a duplicate cache entry hit when the duplicate cache entry output matches the cache target and the duplicate cache entry parity result good is asserted;
I) circuitry for asserting a cache entry hit when either the primary cache entry hit has been asserted in circuit (G) or when the duplicate cache entry hit has been asserted in circuit (H);
J) circuitry for comparing the primary cache entry output to the duplicate cache entry output;
G) circuitry for asserting a multiple bit parity error when the primary cache entry output does not match the duplicate cache entry output and the primary cache parity result good is asserted and the duplicate cache entry parity result is good is asserted; and
H) circuitry for asserting a both cache entries bad error when the primary cache parity result good is negated and the duplicate cache entry parity result good is negated.

5. The cache compare circuitry in claim 4 which further comprises:
I) circuitry for identifying a fatal entry error when either a multiple bit parity error was asserted in circuit (G) or a both cache entries bad error was asserted in circuit (H).

6. The cache compare circuitry in claim 4 wherein:
the comparing in circuits (A), (B), and (J) and the parity testing in circuits (E) and (F) are performed substantially in parallel.

7. The cache compare circuitry in claim 4 which further comprises:
circuitry for identifying a Both Cache Entries Bad error when the primary cache parity result bad is negated and the duplicate cache entry parity result good is negated.

8. The cache compare circuitry in claim 4 wherein:
the testing of the parity in circuit (F) and the testing of the parity in circuit (G) utilize XOR parity testing resulting in even parity.

* * * * *

UNITED STATES PATENT AND TRADEMARK OFFICE
CERTIFICATE OF CORRECTION

PATENT NO. : 6,898,738 B2 Page 1 of 1
DATED : May 24, 2005
INVENTOR(S) : Charles P. Ryan, William A. Shelly and Stephen A. Schuerich It is certified that error appears in the above-identified patent and that said Letters Patent is hereby corrected as shown below:

Title page,
Item [75], Inventors, "Schuerich" should be corrected to -- Scheurich --.

Signed and Sealed this

Twentieth Day of September, 2005

JON W. DUDAS
*Director of the United States Patent and Trademark Office*